US012803476B2

(12) United States Patent
Marchner et al.

(10) Patent No.: US 12,803,476 B2
(45) Date of Patent: Nov. 17, 2026

(54) METHOD AND APPARATUS FOR ACTUATING AN ELECTRIC MOTOR, COFFEE MACHINE, COMPUTER PROGRAM PRODUCT AND COMPUTER-READABLE STORAGE MEDIUM

(71) Applicant: BSH Hausgeräte GmbH, Munich (DE)

(72) Inventors: Maximilian Marchner, Tacherting (DE); Christian Nerbl, Wasserburg am Inn (DE); Florian Garschhammer, Palling (DE); Simon Gallinger, Traunreut (DE)

(73) Assignee: BSH Hausgeräte GmbH, Munich (DE)

( * ) Notice: Subject to any disclaimer, the term of this patent is extended or adjusted under 35 U.S.C. 154(b) by 250 days.

(21) Appl. No.: 18/395,823

(22) Filed: Dec. 26, 2023

(65) Prior Publication Data

US 2024/0213896 A1 Jun. 27, 2024

(30) Foreign Application Priority Data

Dec. 23, 2022 (DE) ......................... 102022214363.9

(51) Int. Cl.
*H02P 6/21* (2016.01)
*A47J 31/42* (2006.01)
*A47J 42/44* (2006.01)
*A47J 42/46* (2006.01)

(52) U.S. Cl.
CPC ................ *H02P 6/21* (2016.02); *A47J 31/42* (2013.01); *A47J 42/44* (2013.01); *A47J 42/46* (2013.01)

(58) Field of Classification Search
CPC .... H02P 6/21; A47J 31/42; A47J 42/44; A47J 42/46
See application file for complete search history.

(56) References Cited

U.S. PATENT DOCUMENTS

2009/0056554 A1* 3/2009 Beule ...................... A47J 42/44 99/286
2023/0414030 A1* 12/2023 Widanagamage Don .................. A47J 31/0663
2025/0261798 A1 8/2025 Büttiker et al.

FOREIGN PATENT DOCUMENTS

DE 102013102525 A1 9/2014
DE 102018119723 A1 2/2020
WO 2008001403 A1 1/2008
WO 2022094659 A1 5/2022
WO 2022253639 A1 12/2022

* cited by examiner

*Primary Examiner* — Zoheb S Imtiaz
(74) *Attorney, Agent, or Firm* — Laurence A. Greenberg; Werner H. Stemer; Ralph E. Locher

(57) ABSTRACT

A method for actuating an electric motor includes modulating a drive power provided to the electric motor by using a ramp function for a change in rotational speed of the electric motor from a starting rotational speed to a target rotational speed. The target rotational speed is only reached after at least 200 ms, starting from the starting rotational speed. An apparatus, a fully automatic coffee machine having the apparatus, a computer program product and a computer-readable storage medium are also provided.

15 Claims, 2 Drawing Sheets

METHOD AND APPARATUS FOR ACTUATING AN ELECTRIC MOTOR, COFFEE MACHINE, COMPUTER PROGRAM PRODUCT AND COMPUTER-READABLE STORAGE MEDIUM

CROSS-REFERENCE TO RELATED APPLICATION

This application claims the priority, under 35 U.S.C. § 119, of German Patent Application DE 10 2022 214 363.9, filed Dec. 23, 2022; the prior application is herewith incorporated by reference in its entirety.

FIELD AND BACKGROUND OF THE INVENTION

The invention relates to a method and an apparatus for actuating an electric motor, in particular the motor of a grinder of a fully automatic coffee machine, a computer program product and a computer-readable storage medium.

Fully automatic coffee machines usually have a grinder that is driven by an electric motor for grinding coffee beans. The electric motor is switched on by applying the full available voltage. That not only leads to a clearly perceptible noise development, but also to the occurrence of current peaks, which can negatively affect the electromagnetic compatibility (EMC) of the device and reduce the serviceable life of the electric motor.

SUMMARY OF THE INVENTION

It is accordingly an object of the invention to provide a method and an apparatus for actuating an electric motor, a computer program product and a computer-readable storage medium, which overcome the hereinafore-mentioned disadvantages of the heretofore-known methods, devices, computer program products and storage media of this general type, in which the method and apparatus actuate an electric motor, in particular the motor of a grinder of a fully automatic coffee machine, and can carry out a grinding process of coffee beans in a simple, quiet and gentle manner.

This object is achieved by a method, a control apparatus and a fully automatic coffee machine in accordance with the main claim or one of the independent or dependent claims.

The method in accordance with the invention is used to actuate an electric motor, preferably the grinder of a fully automatic coffee machine. In this case, the actuation relates in particular to the start-up of the electric motor, because the greatest noise development and the greatest current peaks occur in the process. However, the actuation can also relate to the braking of the electric motor after the grinding process, since current peaks can also occur there. In particular, the actuation also includes a reversal of the direction of rotation of the electric motor, wherein this can basically be regarded as braking the motor with the subsequent start-up (with the direction of rotation reversed).

In accordance with the invention, for a change in the rotational speed of the electric motor, in other words for a start-up or braking of the electric motor, a drive power that is provided to the electric motor is modulated by using a ramp function so that the rotational speed of the electric motor, starting from a starting rotational speed (for example zero), reaches a target rotational speed (for example the maximum rotational speed). The ramp function is configured so that this target rotational speed (starting from the starting rotational speed) is only reached after at least 200 ms. Basically, this time corresponds to a time length of the ramp function. Of course, the starting rotational speed and the target rotational speed differ, since otherwise no change would be possible. The difference is preferably greater than half the maximum rotational speed of the motor, which is the rotational speed of the motor at an intended maximum power. In particular, this is more than 3000 rpm. The rotational speed of the motor shaft is always intended.

The electric motor is preferably started up so that the increase in the drive power that is provided to the electric motor from a start value (which preferably corresponds to the rotational speed of zero) to a predetermined target value Z (which typically corresponds to the maximum desired rotational speed for the grinding process) does not exceed 5 Z per second, at least in a predetermined interval of the ramp function. In the case of braking, this applies accordingly to the drop in the drive power. The term "actuating" also includes regulating the electric motor (simplified below: "motor").

The drive power is the power that drives the motor. The drive power is usually determined by the voltage that is provided to the motor and can also correspond to the voltage. The power at the intended voltage for the motor, for example 120 V or 240 V, can be regarded as the maximum power. However, in accordance with the invention, the motor is preferably driven using a periodic modulation having a certain duty cycle that is based on the ramp function. This drive is based on the fact that the motor is provided with voltage pulses in regular, always identical periods, the time length and form of which result in the drive power. For this purpose, it should be noted that the ramp function does not necessarily have to specify the drive power but serves to modulate it. The ramp function can therefore certainly predetermine a phase angle, a duty cycle or even a waveform or amplitude. The main issue is that the motor does not reach its target rotational speed immediately, but only after a time that must last longer than 200 ms.

When the motor is started up, the drive power is changed so that the motor is started up from a starting rotational speed to a target rotational speed, preferably the desired maximum rotational speed. The start-up begins with a start value of the drive power that is provided to the motor and that causes the starting rotational speed (preferably a drive power of zero, but can theoretically also be greater than zero) and ends with a target value Z that causes the target rotational speed.

The starting rotational speed is preferably 0 rpm during start-up, but can theoretically also be greater, but should not exceed 1000 rpm.

The target rotational speed is preferably greater than 5000 rpm, in particular greater than 7000 rpm. However, the target value should not be too high, at least if a grinder is to be operated, and should be below 20,000 rpm, in particular below 10,000 rpm. As seen relative to the maximum rotational speed M of the motor, in other words the rotational speed at maximum power, the target rotational speed is preferably greater than 10% of the maximum rotational speed (>0.1M), in particular greater than 50% of the maximum rotational speed (>0.5M), particularly preferably greater than 66% of the maximum rotational speed (>0.66 M) or even corresponds to the maximum rotational speed (=M). If the starting rotational speed is greater than zero, this target rotational speed is preferably above the starting rotational speed by the relevant value.

When braking, it is exactly the other way around. In this case, the starting rotational speed is high and corresponds to the previous values for the target rotational speed; the target rotational speed, conversely, is low and corresponds to the previous values for the starting rotational speed. The drive power is now changed so that the motor is shut down, in other words braked, from the starting rotational speed to the target rotational speed. "Braking" in this case means that the motor is supplied with steadily decreasing power, thus accordingly inverted with respect to starting up, where the motor is supplied with steadily increasing power. The braking begins with a start value of the drive power that is provided to the motor and that causes the starting rotational speed and ends with a target value Z that causes the target rotational speed.

The ramp function specifies how the effective power must be modulated in order to get from the start value to the target value. The ramp function is configured so that the target value is only reached after at least 200 ms. For this purpose, the ramp function is preferably configured so that, at least in a predetermined interval of the ramp function, but preferably in the entire ramp function, the increase in the drive power in time does not exceed the value of 5 Z per second. For example, in the case of a linear increase in the drive power from 0 to Z, this corresponds to the time span of 200 ms. The same applies to a braking process.

The time period, in other words the total time length of the ramp function, is preferably longer than 200 ms. In order for the grinding process to not take longer than necessary compared to an immediate switching on of the motor, it is preferable for the total time length of the ramp function to be shorter than 2 s, in other words for the target rotational speed to be reached earlier than after 2 s. The time span in other words the total time length of the ramp function) is particularly preferably greater than 400 ms, in particular greater than 700 ms. In particular, the increase or decrease in the drive power that is provided to the electric motor is less than 7 Z/s (per second), in particular less than 9 Z/s, or even less than 10 Z/s.

The inventors recognized that a large increase or decrease in the motor rotational speed in too short a time entails both increased noise pollution as well as disadvantages in terms of EMC. Since the motor rotational speed depends on the drive power that is provided to the motor, the method reduces the increase in the motor rotational speed when the motor is started up (or the drop when the motor is braked) compared to a conventional switching on. However, this does not reduce the motor speed that is required for grinding, but only reaches it slightly later, so that the result of the grinding process is not impaired.

In a preferred method, the drive power results from a modulated voltage, wherein the voltage is modulated by using the ramp function during a start up of the motor. In this case, the level of the voltage can be modulated. Within a plurality of predetermined periods, voltage pulses having duty cycles that are based on the ramp function particularly preferably drive the electric motor. In this case, in particular, the duty cycle is modulated over the various periods. This means that a voltage pulse with a time length less than or equal to T is applied to the motor within a predetermined time length or period T. The shorter the voltage pulse, the lower the drive power. The time ratio between T and the time length of the voltage pulse is the duty cycle. In this case, many voltage pulses are applied to the motor in succession in successive periods of the time length T.

Two preferred cases can be distinguished:

In the case of a DC voltage for driving the motor, pulse width modulation is performed. The voltage always remains the same. The duty cycle is then the ratio of the duration TP of a voltage (the voltage pulse) that is applied to the motor for the duration T of the respective period (duty cycle=TP/T).

In the case of an AC voltage for driving the motor, the period duration can correspond to the period of the AC voltage (or, if half waves are used, to the half thereof), but it is not necessarily fixed at a multiple of the half period duration. Only a part of the "voltage wave", either the first part or the last part, is then used as the voltage pulse. This is known as phase firing modulation or as phase cutting modulation in the prior art. If a phase firing modulation or a phase cutting modulation is performed, the duty cycle can be characterized by a phase angle at which the phase firing ends or the phase cutting begins. The motor therefore only receives a partial wave, the time length of which determines the drive power. Since the phase angle determines the time length of the partial wave, the phase angle also determines the drive power. The smaller the phase angle, the greater the drive power.

The ramp function is preferably configured so that the drive power, for example the duty cycle, increases steadily (during start up) or decreases (during braking) (as time progresses). Since the motor can be sluggish and only begins to rotate at all at a duty cycle greater than zero, at the beginning of the ramp function the duty cycle preferably begins at a value greater than zero during start-up. This means that the drive power at the beginning of the ramp function preferably has a start value greater than zero. The duty cycle during start-up preferably ends at the end of the ramp function at a value greater than 80%, in particular at 100%. This results in the target value of the drive power or the target rotational speed of the motor. In the case of phase firing modulation, the ramp function preferably begins with a phase angle greater than 20° during start up. In the case of a phase cutting modulation, the ramp function preferably ends with a phase angle of less than 340° at full wave or 160° at a half wave.

When braking the motor, it is preferably exactly the other way around and at the beginning of the ramp function the duty cycle starts at a value less than or equal to 100% (for example 80%) and preferably ends at a value less than 20%. In the case of phase firing modulation, the ramp function preferably begins at a phase angle of less than 160° in the case of a half wave or 340° in the case of a full wave.

In a preferred method, the predetermined interval of the ramp function includes at least the last quarter of the ramp function, in particular the second half. The inventors recognized that in the case of different ramp functions, undesirable effects occurred towards the end of the ramp function. The predetermined interval particularly preferably includes the entire ramp function.

In a preferred method, the ramp function is predetermined, its form and time length are therefore determined before it is used. The ramp function is preferably configured so that it causes a time-discrete change in a phase firing. In the case of time-discrete actuation, it is preferably statically determined, for example with the aid of simulations, to what extent the current can be reduced so that grinding can be carried out with the highest degree of efficiency. The time losses for the start-up of the motor are thereby kept as low as possible with a simultaneous gentle current increase.

Alternatively, the ramp function is regulated during the actuation of the motor based on sensor values. In this case, a PID-controlled change in the phase firing is particularly preferred. In the case of PID-controlled actuation, a regulating algorithm is preferably stored that regulates the ramp function.

In accordance with a preferred method, the ramp function can be selected and/or configured by a user. A plurality of predetermined ramp functions or a selection of adjustable parameters for a ramp function are preferably available to the user for this purpose. Parameters that can be set are preferred:

a minimum phase firing for the indirect determination of the target rotational speed, a time for the total time length of the ramp function or for the duration of the start-up phase, a form of the ramp function, a minimum and/or maximum width of the duty cycle.

The ramp function is preferably configured so that the electromagnetic compatibility and/or the serviceable life is optimized. For example, magnets of an electric motor can "de-magnetize" themselves when high starting currents occur over time at a load collective. If the magnet is already magnetically "weak" from the outset, the process of demagnetization accelerates and a failure occurs early. If the ramp function is configured, for example, so that the starting current that is transmitted per time is below a predetermined limit, the serviceable life will increase.

The electric motor is preferably started up as well as decelerated by using the ramp function. During start-up, the target rotational speed is therefore only reached after at least 200 ms. and the braking process during braking also takes at least 200 ms. During start-up, the target rotational speed is higher than the starting rotational speed and the starting rotational speed is preferably zero. During braking, the starting rotational speed is greater than the target rotational speed (since braking is carried out). During braking, the starting rotational speed preferably corresponds to the target rotational speed during start-up (start-up is performed, for example, up to the maximum rotational speed, which is then to be regarded as the starting rotational speed for the braking). Accordingly, during braking, the target rotational speed preferably corresponds to the starting rotational speed during start up, in other words for example, zero.

It can be preferred to change the direction of rotation of the motor. As a result, a grinding mechanism can be "relaxed" or "emptied", wherein in this regard an attempt should be made to change the direction of rotation of the grinding mechanism in order to reduce its prestress and to eject blocking particles again. The problem in this case is the very short voltage increase and the resulting problems in EMC and service life. This problem does not occur using the method in accordance with the invention, at least not if the braking process and/or the subsequent start-up process take longer than 200 ms. It is therefore preferred after braking to control a renewed start-up with a reverse direction of rotation by using the ramp function corresponding to the method.

It should be noted that the ramp functions for starting up and braking or for starting again do not necessarily have to be identical, although this is a preferred embodiment. The ramp functions can differ in form or length of time, wherein it is however advantageous if the basic features of the method in accordance with the invention are fulfilled for both (or all) ramp functions (at least 200 ms until the target rotational speed is reached).

An apparatus in accordance with the invention for actuating or regulating a motor is configured to implement a method as claimed in one of the preceding claims. The apparatus includes information regarding a ramp function or can access such information and is configured to control or regulate the drive power so as to actuate the motor. As explained above, the drive power can be modulated via a change in the voltage or a duty cycle, in other words, possibly, a phase angle. Electric circuits for controlling a motor by using PWM, a phase firing modulation or a phase cutting modulation are known from the prior art.

The apparatus preferably includes a configuration interface that is configured so as to accept user input for configuring the ramp function (see above).

It is preferable to choose a ramp function based on tests or simulations, which led to a low noise level during the test or simulation.

A large proportion of the above-mentioned components of the invention can be realized entirely or in part in the form of software modules in a processor of a corresponding computer system, for example of a control facility of a fully automated coffee machine or an external control device. A largely software-based realization has the advantage that devices that are already previously used can be retrofitted in a simple manner by a software update in order to function in the manner in accordance with the invention. In this respect, the object is also achieved by a corresponding computer program product having a computer program, which can be loaded directly into a computer system, having program sections in order to perform the steps of the method in accordance with the invention, at least the steps that can be performed by a computer, if the program is executed in the computer system. This is basically the generation of control signals for the modulation, by using the ramp function, of a drive power that is provided to an electric motor. Such a computer program product in addition to the computer program can where necessary include additional components such as for example a documentation and/or additional components, and also hardware components such as for example hardware keys (dongles etc.) in order to use the software.

Other features which are considered as characteristic for the invention are set forth in the appended claims.

Although the invention is illustrated and described herein as embodied in a method and an apparatus for actuating an electric motor, a computer program product and a computer-readable storage medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
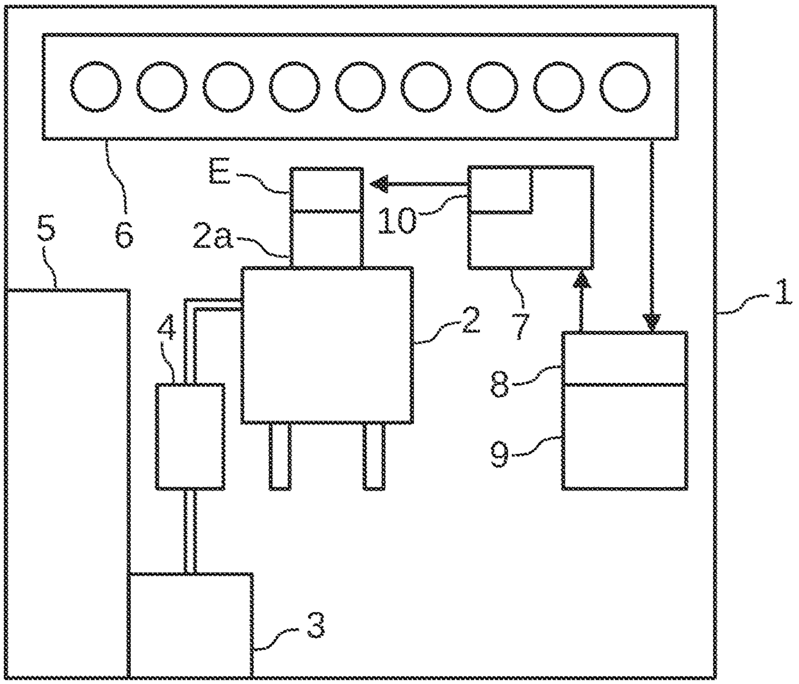
FIG. 1 is a diagrammatic, elevational view of an example of a coffee machine.

Referring now to the figures of the drawings in detail and first, particularly, to FIG. 1 thereof, there is seen a fully automatic coffee machine 1. The coffee machine includes, in addition to other units that are required for the preparation of coffee, in particular the following components:

- a brewing unit 2 that is coupled to a grinder 2*a*, wherein the coffee powder from the grinder 2*a* is pressed in the brewing unit 2,
- a pump 3, through which water is pumped from a water tank 5 through a flow heater as a heating element 4 into the brewing unit 2,
- a selection unit 6 for manual selection by the operator and for specifying a desired type of coffee beverage and/or for selecting a grinding mode,
- a control facility 7 that is configured so as to control the preparation of a coffee beverage of the selected coffee beverage type K by the coffee machine 1, wherein the control facility contains an apparatus 10 in accordance with the invention,
- a computing unit 9 that is configured so as to calculate control data for the control facility 7, and
- a data interface 8 for establishing a data contact with the selection unit 6.

As a result, data for selecting the type of coffee beverage can be forwarded to the computing unit 9. The arrow from the selection unit 6 to the data interface 8 is intended to indicate the direction of the data flow. This data interface 8 is also configured so as to send control data (see second arrow) to a control facility 7 so as to control a preparation of a coffee beverage of the selected coffee beverage type by the coffee machine 1.

Figure 2:
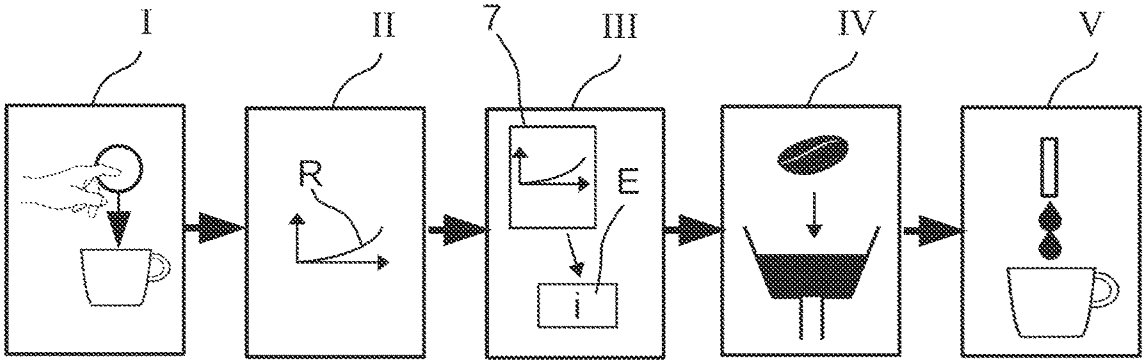
FIG. 2 is a block diagram illustrating the execution of a method in accordance with the invention.

In order to prepare a coffee beverage, water is pumped from the water tank 5 by the pump 3 through the heating element 4, heated there to the target temperature, and, in the hot state, passes into the brewing unit 2, in which there is coffee powder, which has been ground by the grinder 2*a* that is driven by an electric motor E. This process of grinding is controlled by the control facility 7 (or the special apparatus 10) in the manner described below:

FIG. 2 illustrates a block diagram for the execution of a method in accordance with the invention for the actuation (corresponding to a control or regulation) of an electric motor of the grinder 2*a*, for example of the fully automatic coffee machine 1 that is illustrated in FIG. 1.

In step I, a selection of a coffee beverage is made by a user by using the selection unit 6.

In step II, a ramp function is selected. This can also be done by the user by using the selection unit 6, but a preconceived ramp function R or a ramp function R that is linked to the selected coffee beverage can also be used.

In step III, the electric motor E is actuated by the apparatus 10 based on the ramp function R. In this case, during the start-up of the electric motor E, a drive power is modulated by using the ramp function R so that the increase or decrease in the drive power that is provided to the electric motor E from a start value $P_S$ to a predetermined target value $P_Z$ does not exceed five times the target value per second, in other words, it lasts at least 200 ms. This is determined by the ramp function R. This is configured accordingly.

In step IV, coffee beans are ground into coffee powder by the grinder 2*a* that is driven by the electric motor E.

In step V, the desired coffee beverage is brewed from the ground coffee powder.

Figure 3:
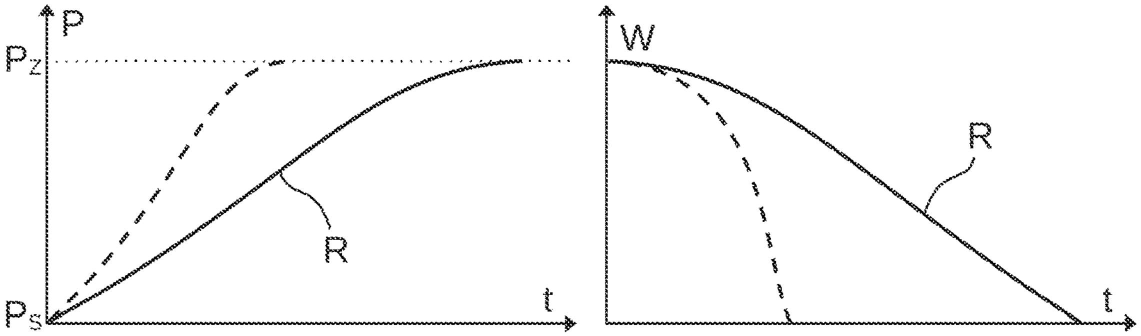
FIG. 3 is a diagram showing examples of ramp functions.

FIG. 3 illustrates examples of ramp functions R. On the left-hand side, an example of a ramp function R (solid line) can be seen, which acts directly on the drive power P. The ramp function has a moderate increase from the starting value $P_S$ (in this case zero) to the target value $P_Z$, in contrast to the function that is indicated by the dashed line, which starts particularly steeply and reaches the target value $P_Z$ much earlier.

A further example of a ramp function R that acts on a phase angle W of a phase firing modulation is shown on the right-hand side. The example is started at a fairly large phase angle W, which means that the phase firing is large and thus the drive power P is small. The ramp function R ends with a phase angle W of zero, which means that the phase firing is small and thus the drive power P is large. The drive power P would correspond to the progression of the drive power P in the left-hand image. In this case, too, a curve is indicated by dashed lines, which would correspond to a steep progression of the drive power.

Figure 4:
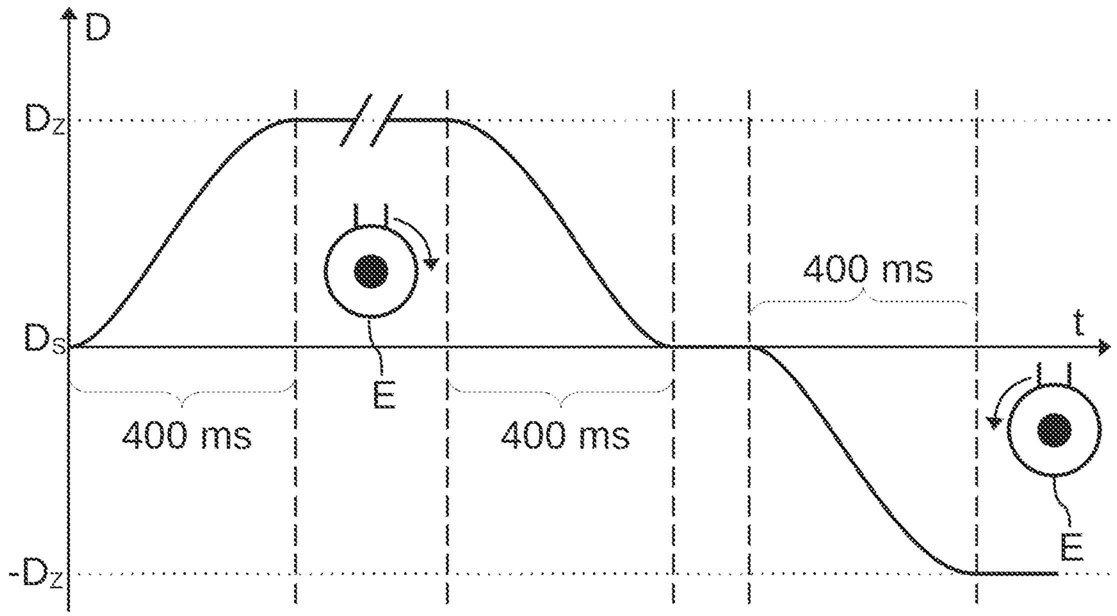
FIG. 4 is a diagram showing an example of the speed change of an electric motor.

FIG. 4 shows an example of the rotational speed change of an electric motor E. A plot of the rotational speed D against the time t is shown. First, the rotational speed D increases from a starting rotational speed $D_S$ (in this case zero) to a target rotational speed $D_Z$. This is done by the method in accordance with the invention and takes 400 ms in this case. The electric motor E now rotates in a first direction of rotation over a certain time, which is indicated in this case by broken the section of the line. During this time, the grinder of a coffee machine according to FIG. 1 would therefore run at normal rotational speed D. Then, in accordance with the method according to the invention, the electric motor E is braked back to the starting rotational speed $D_S$ (zero) within 400 ms and then restarted in the reverse direction of rotation, likewise in accordance with the method according to the invention, within 400 ms. This is represented by the progression of the line in the negative quadrant up to the negative target rotational speed $D_Z$. The electric motor E can be controlled by using ramp functions R, as is illustrated in FIG. 3. The reversal of the direction of rotation can also be omitted and the motor can simply be started up and braked.

Since the above embodiments that are described in detail are examples, they can be modified to a large extent by a person skilled in the art in a conventional manner without departing from the scope of the invention. In particular, the specific embodiments of the apparatus or the method can also follow in a form other than that described herein. Furthermore, the use of the indefinite article "a" or "an" does not rule out that the relevant features can also be provided multiple times.

The following is a summary list of reference numerals and the corresponding structure used in the above description of the invention.

LIST OF REFERENCE NUMERALS

1 Coffee machine
2 Brewing chamber
2*a* Grinder
3 Pump
4 Heating element
5 Water tank
6 Selection unit
7 Control facility
8 Data Interface
9 Computing unit
10 Apparatus
D Rotational speed
DS Starting rotational speed
DZ Target rotational speed
E Electric motor
P Drive power PS Starting value
PZ Target value
R Ramp function
W Phase angle

The invention claimed is:

1. A method for actuating an electric motor, the method comprising:
- selecting a ramp function having a form and time length that is predetermined before use, the ramp function specifying a modulation of an effective power to the electric motor to drive the electric motor from a starting rotational speed to a target rotational speed over a time period of at least 200 ms;
- using the selected ramp function to modulate the drive power provided to the electric motor, to change the rotational speed of the electric motor from the starting rotational speed to the target rotational speed over the time period of at least 200 ms defined by the ramp function.

2. The method according to claim 1, which further comprises:
- establishing the drive power from a modulated voltage, and modulating the voltage by using the ramp function during a change, start up or braking of the rotational speed of the electric motor;
- within a plurality of predetermined periods, using voltage pulses having duty cycles based on the ramp function to drive the electric motor and modulating the duty cycles;
  - for a DC voltage for driving the electric motor, performing a pulse width modulation, and using a duty cycle to indicate a ratio of a duration of the voltage pulses to a duration of a respective period, and
  - for an AC voltage for driving the electric motor, performing a phase firing modulation or a phase cutting modulation, and characterizing a duty cycle by a phase angle at which the phase firing ends or the phase cutting begins.

3. The method according to claim 2, which further comprises:
- configuring the ramp function to cause the drive power to change steadily, increase steadily or decrease steadily;
  - for starting up, at a beginning of the ramp function, beginning the duty cycle at a value greater than zero and ending the duty cycle at a value greater than 80%, and upon phase firing modulation, beginning the ramp function at a phase angle greater than 20°, and
  - for braking, at the beginning of the ramp function, beginning the duty cycle at a value of less than 100% and ending the duty cycle at a value of less than 20%, and upon phase firing modulation, beginning the ramp function at a phase angle of less than 160° for a half wave, or 340° for a full wave.

4. The method according to claim 1, which further comprises:
- preventing the increase or decrease in the effective power provided to the electric motor from a start value to a predetermined target value Z from exceeding 5 Z per second, at least in a predetermined interval of the ramp function; and
- causing the predetermined interval of the ramp function to include at least a last quarter of the ramp function, or a second half, or an entirety of ramp function.

5. The method according to claim 1, which further comprises predetermining the ramp function and causing a time-discrete change in a phase firing, or regulating the ramp function based on sensor values during the actuation of the electric motor, or carrying out a PID-controlled change in the phase firing.

6. The method according to claim 1, which further comprises adjusting a total time length of the ramp function to be at least one of longer than 400 ms or shorter than 2 s.

7. The method according to claim 1, wherein the selection of the ramp function is performed by a user and which further comprises setting:
- at least one of a minimum or maximum phase firing, or
- a time for a total time length of the ramp function, or
- a form of the ramp function, or
- at least one of a minimum or maximum width of a duty cycle.

8. The method according to claim 1, which further comprises configuring the ramp function to optimize at least one of an electromagnetic compatibility or a serviceable life of the electric motor.

9. The method according to claim 1, which further comprises using the ramp function to control a change in the drive power from a start value to a target value, and configuring the ramp function to ensure that an increase or decrease in the drive power provided to the electric motor, from a start value to a predetermined target value Z, does not exceed 5 Z per second, at least in a predetermined interval of the ramp function.

10. The method according to claim 1, which further comprises:
- using the ramp function to perform both starting up of the electric motor and braking of the electric motor, during start-up the target rotational speed being higher than the starting rotational speed and the starting rotational speed being zero, and during braking the starting rotational speed corresponding to the target rotational speed during start-up, and during braking the target rotational speed corresponding to the starting rotational speed during start-up;
- after braking, performing a renewed start-up with a reverse direction of rotation being performed by using the ramp function, and only permitting the target rotational speed, starting from the starting rotational speed, to be reached after at least 200 ms for the renewed start-up.

11. An apparatus for actuating an electric motor, the apparatus configured to implement the method according to claim 1.

12. The apparatus according to claim 11, which further comprises a configuration interface configured to accept user input for configuring the ramp function by at least one of selecting or configuring the ramp function to set:
- at least one of a minimum or maximum phase firing, or
- a time for a total time length of the ramp function, or
- a form of the ramp function, or
- at least one of a minimum or maximum width of a duty cycle.

13. A fully automatic coffee machine, comprising an apparatus according to claim 11, the apparatus configured to actuate an electric motor of a grinder.

14. A non-transitory computer program product, comprising commands that, when executing a program on a computer, cause the computer to generate control signals for the modulation, by using the ramp function, of a drive power provided to an electric motor according to claim 1.

15. A computer-readable storage medium, comprising commands that, when executed by a computer, cause the computer to generate control signals for the modulation, by using the ramp function, of a drive power provided to an electric motor according to claim 1.

* * * * *